United States Patent
Jong et al.

(10) Patent No.: US 8,594,816 B2
(45) Date of Patent: Nov. 26, 2013

(54) METHOD AND SYSTEM FOR MEASURING TASK LOAD

(75) Inventors: Alex Kwang-Ho Jong, San Diego, CA (US); Balam Subhash Chandra Yadhav, San Diego, CA (US); Ravi Kishore Paruchuru, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1016 days.

(21) Appl. No.: 12/482,524

(22) Filed: Jun. 11, 2009

(65) Prior Publication Data

US 2009/0312856 A1    Dec. 17, 2009

Related U.S. Application Data

(60) Provisional application No. 61/060,532, filed on Jun. 11, 2008.

(51) Int. Cl.
*G06F 17/00* (2006.01)
*G06F 9/50* (2006.01)
*G06F 9/52* (2006.01)

(52) U.S. Cl.
USPC .............................. 700/94; 718/104; 718/107

(58) Field of Classification Search
USPC ...................... 700/94; 718/102–108
See application file for complete search history.

(56) References Cited

U.S. PATENT DOCUMENTS

| | | | |
|---|---|---|---|
| 4,937,780 A | 6/1990 | Geyer et al. | |
| 5,265,249 A | 11/1993 | Kumamoto | |
| 5,628,013 A | 5/1997 | Anderson et al. | |
| 5,864,080 A | 1/1999 | O'Connell | |
| 5,978,832 A * | 11/1999 | Sirkin | 718/107 |
| 5,981,860 A | 11/1999 | Isozaki et al. | |
| 6,301,603 B1 * | 10/2001 | Maher et al. | 718/105 |
| 6,470,376 B1 * | 10/2002 | Tanaka et al. | 718/108 |
| 6,782,350 B1 | 8/2004 | Burnley et al. | |
| 2002/0049969 A1 | 4/2002 | Duquesnois et al. | |
| 2006/0155543 A1 | 7/2006 | Cooper | |
| 2007/0136729 A1 * | 6/2007 | Neuman | 718/102 |

FOREIGN PATENT DOCUMENTS

| | | |
|---|---|---|
| CN | 1393094 A | 1/2003 |
| CN | 101145125 A | 3/2008 |
| EP | 1391824 | 2/2004 |

(Continued)

OTHER PUBLICATIONS

Persson, Patrik, "A Tool for Measuring and Analyzing Real-Time Task Execution Times", Dec. 4, 1998, Lund Institute of Technology, all pages.*

(Continued)

*Primary Examiner* — Jesse Elbin
(74) *Attorney, Agent, or Firm* — Nicholas J. Pauley; Peter Michael Kamarchik; Joseph Agusta (57) ABSTRACT

A method for determining the task load in real-time. The method takes a difference in real-time between a first count value from a free running counter prior to a task executing, and a second count value after the task stops running. The task load may then be determined by using an accumulator to accumulate the difference between the first count value and the second count value over a reference interval and dividing the sum by a configurable reference interval. The individual task load computed in real-time may be used in scheduling an audio task.

21 Claims, 9 Drawing Sheets

(56) References Cited

FOREIGN PATENT DOCUMENTS

| | | |
|---|---|---|
| GB | 2440216 | 1/2008 |
| JP | 5012040 A | 1/1993 |
| JP | 06059678 | 3/1994 |
| JP | 6186973 A | 7/1994 |
| JP | 06208382 | 7/1994 |
| JP | 2000155585 A | 6/2000 |
| JP | 2005267313 A | 9/2005 |
| WO | 03050758 | 6/2003 |
| WO | 2006085244 | 8/2006 |

OTHER PUBLICATIONS

International Search Report—PCT/US2009/047005, International Search Authority—European Patent Office Oct. 14, 2009.

Written Opinion—PCT/US2009/047005, International Search Authority—European Patent Office Oct. 14, 2009.

* cited by examiner (PRIOR ART)
FIG. 1

Scheduling an audio task

FIG. 9

METHOD AND SYSTEM FOR MEASURING TASK LOAD

RELATED APPLICATIONS

This application is related to and claims priority from U.S. Provisional Patent Application Ser. No. 61/060,532, filed Jun. 11, 2008, for METHOD AND SYSTEM FOR MEASURING TASK LOAD, which is fully incorporated herein by reference.

FIELD OF DISCLOSURE

The described embodiments generally relate to real time computing. More particularly, the described embodiments relate to measuring one or more task loads that can be used to regulate an application's load on the system.

BACKGROUND

Figure 1:
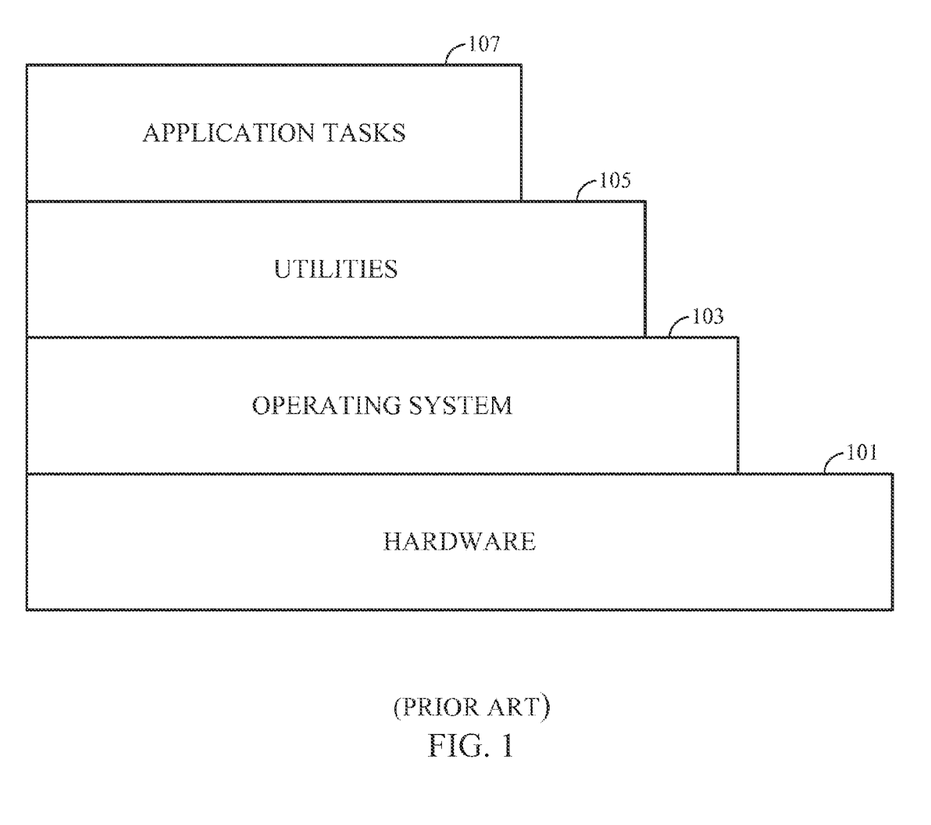
FIG. 1 is a block diagram illustration of a real time computing system.

FIG. 1 generally describes prior art of a real time computing system. A real time computing system controls the execution of application programs and interfaces to the system hardware and utilities. A real time computing system 103 may be hosted on electronic hardware 101 such as a processor, or a digital signal processor. As an example, hardware may be hardware on a mobile phone or hardware on any device having embedded software or firmware. The utilities 105 are commonly programs that assist the computing system in control of input/output devices, and management of files.

In such applications, it is useful knowing the load on real time computing system from one or more individual tasks for system design considerations or as an input parameter to other applications 107 that may utilize the task load information. A prior art approach to determine the loading of a task is to capture the task execution data using a logic analyzer and count the instructions executed on the particular individual task. This approach is not real-time and therefore does not allow the task load to be used as input to another application that may effectively use the information. For example, a Musical Instrument Digital Interface (MIDI) application may use the real-time task load to determine whether to reduce the MIDI voices processed for a future frame.

SUMMARY

Embodiments disclosed in the detailed description include determining a number of task execution cycles to compute a task load. Determining the number of task execution cycles comprises reading a first count value from a free running counter prior to a task executing, reading a second count value from the free running counter after the task stops running, and taking a difference in real-time between the first count value and the second count value. The task execution cycles may be accumulated over a reference interval. The reference interval may be a configurable value. The task load may be determined by using an accumulator to accumulate the differences between the first count value and the second count value over a reference interval and dividing the sum by the reference interval.

Another embodiment includes scheduling an audio task. Scheduling an audio task comprises establishing a reference interval over which to process an audio task in a current frame and computing a difference between an actual number of cycles to process the audio task and the number of cycles in the reference interval and scheduling parameters for a future audio task. A number of cycles available for processing the future audio task may be computed based on a task load of the audio task and based on the actual number of cycles to process the audio task. A number of cycles available for processing the future audio task may be computed by taking the number of cycles in the reference period (MaxCycles) and subtracting the number of cycles used in processing the current audio task (ActualCycles) and adding the number of cycles used in processing the audio task within the reference interval in a current frame (Accumulated Task Execution Cycles). An exemplary embodiment is where the scheduling parameters are synthesis voice parameters in an audio frame. The reference interval may be configurable via hardware or software. The computed difference is based on a conversion between time and cycles. Exemplary embodiments of scheduling include processing less audio frame parameters for the future audio task relative to the current audio task, or processing an equal or greater number of audio frame parameters for the future audio task relative to the current audio task. The number of cycles available for processing the future audio task may be zero when a maximum number of audio frame parameters are processed or may be zero during power-on of a processor.

Another embodiment is an apparatus comprising a processor for computing the difference between the actual time to process an audio task and the number of cycles in a reference interval, and scheduling a future audio task based on the computed difference. A memory stores the scheduling parameters and a free running counter provides at least two count values to the processor to compute the actual time of the audio task.

Another embodiment is an apparatus comprising a means for retrieving a reference interval over which to process an audio task in a current frame, a means for computing a difference between an actual number of cycles to process the audio task and the number of cycles in the reference interval, and a means for scheduling parameters for a future task.

Another embodiment is a computer-readable medium embodying a set of instructions executable by one or more processors. The computer-readable medium comprises code for retrieving a reference interval over which to process an audio task, code for computing a difference between an actual number of cycles to process the audio task and the number of cycles in the reference interval, and code for scheduling parameters for a future audio task.

DETAILED DESCRIPTION

Various embodiments are disclosed herein the following description and related drawings. Alternate embodiments may be devised without departing from the scope of the invention. Additionally, some well known elements of the invention will not be described in detail or will be omitted so as not to obscure the relevant details of the invention.

The word "exemplary" is used herein to mean "serving as an example, instance, or illustration". Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The term "real time computing system" is used herein to mean, but not limited to, processing at least one task in real time using a scheduling system.

Figure 2:
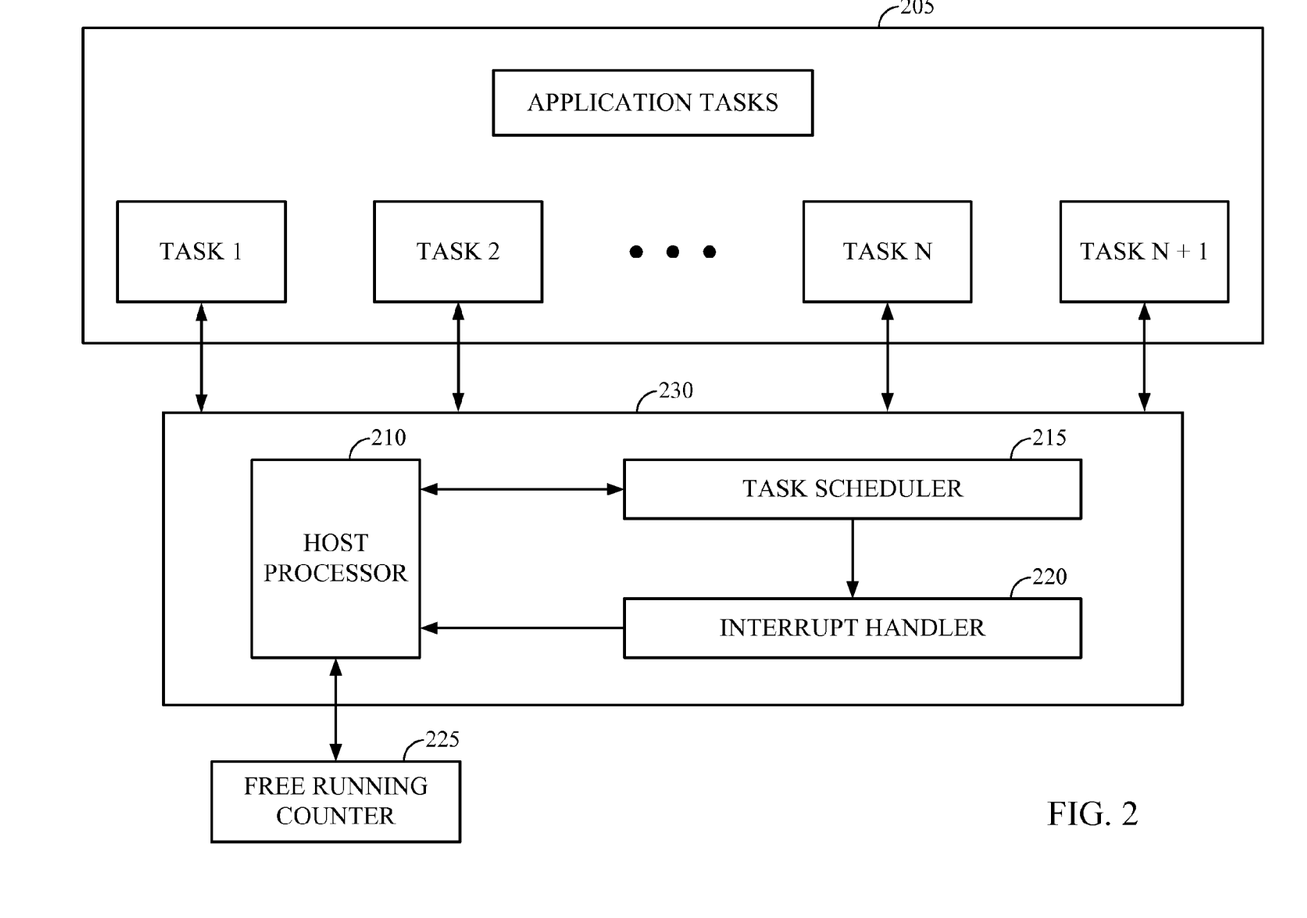
FIG. 2 is a block diagram exemplary embodiment of a real time computing system that measures a task load in real time.

FIG. 2 is an exemplary embodiment of a host processor 210 running a real time computing system 230. The computing system 230 reads and stores the value output from a free running counter 225 at particular intervals. The term "free running counter" is used herein to mean a counter or other reference source that remains running during low power mode, and/or during host processor sleep state. Those skilled in the art will appreciate that reference sources such as a software counter or a hardware counter may be used without departing from the spirit and scope of the representative embodiments. The free running counter 225 may be physically located inside the processor or outside of the processor.

A host processor 210 running a real time computing system 230, processes application tasks 205. Tasks are processed by the task scheduler 215, which decides when the processor 210 is available and when a task is ready for processing. An interrupt handler 220 may be used to interrupt tasks 205 that are currently being executed by the processor 210. Interrupted tasks 205 are managed by the task scheduler.

Figure 3:
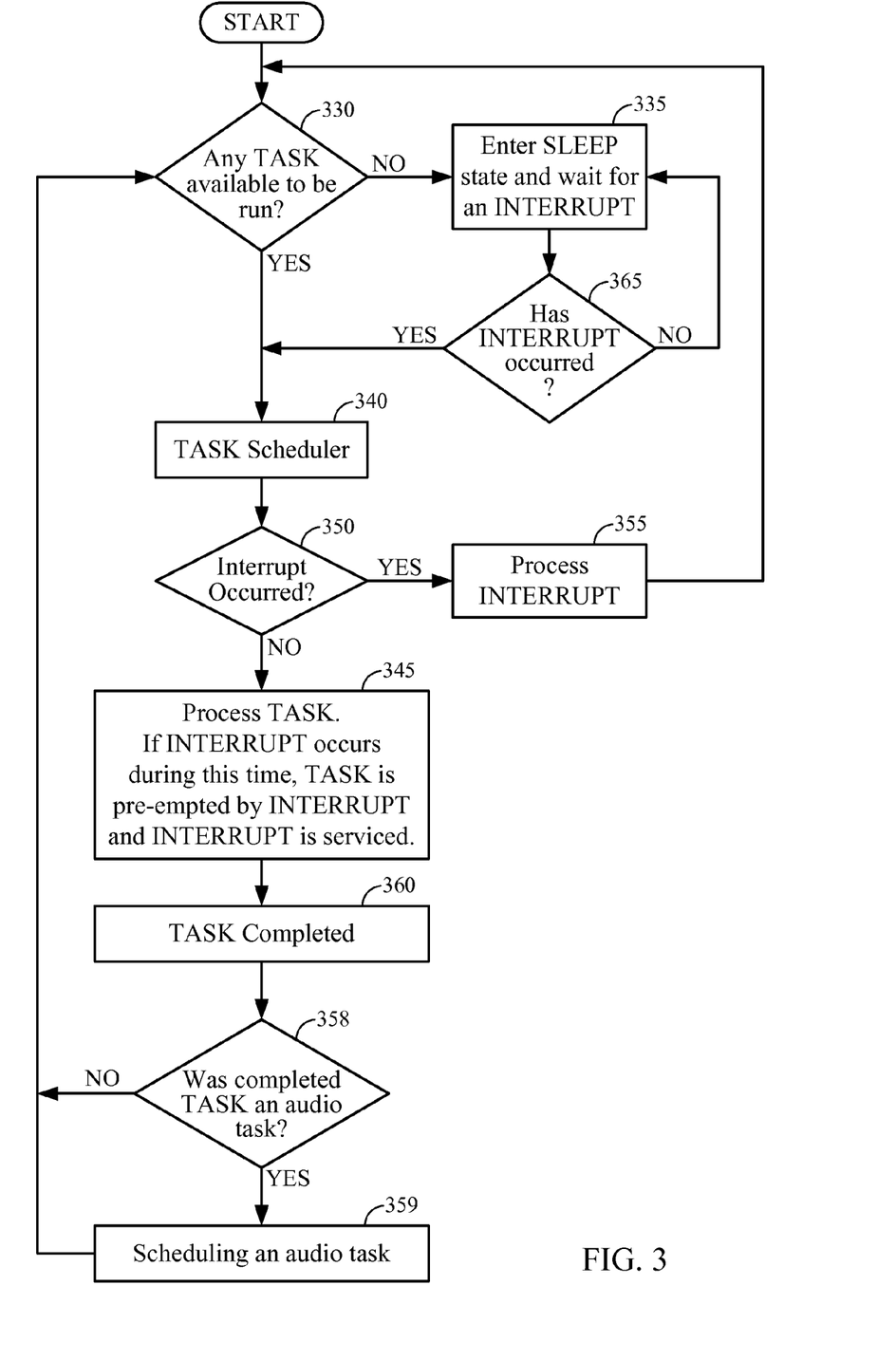
FIG. 3 is a flowchart illustrating a method that may be run on a host processor.

FIG. 3 is a flowchart illustrating an exemplary method that may be run on a host processor 210. Scheduling of tasks 340 may be implemented via numerous schemes. Such schemes, may include, but are not limited to, preemptive schemes and time sharing schemes. Pre-emptive schemes allow the task with the highest assigned priority to be executed first. The pre-emptive scheme may interrupt another lower priority task being processed in order to execute the higher priority task. Time sharing designs execute tasks on a clock interrupt schedule where time slices for processing are allocated to each task until all tasks are complete.

If there are any tasks available to be run (see block 330), a task is scheduled 340 and sent to be processed 345, for example, to a host processor 210. As other tasks become ready for execution and while the host processor is busy executing a current task, the task scheduler 340 will determine whether to preempt the current task 350. Interrupts may be decided based on scheduling scheme or for other considerations.

If the current task is not interrupted, the host processor continues executing the current task 345 until the task is completed 360. If the completed task is not an audio task 358, the host processor begins processing the next task at block 330. If the completed task is an audio task 358, then scheduling a future audio task may be performed 359. Upon completion of block 359 or alternatively concurrently with execution of block 359, the host processor begins processing the next task at block 330. Scheduling an audio task is discussed later.

When an interrupt occurs 350, the interrupt is processed 355. One of ordinary skill in the art may as an example, design the system to save the state of the task being processed or perform other clean-up prior to halting the interrupted task. Therefore, the interrupted task may or may not halt processing immediately upon receiving an interrupt. The task scheduler 340 continues to manage tasks that have not completed execution. Once the current task is halted and the host processor is available, the host processor begins executing the next scheduled task.

When block 330 detects there are no tasks ready to be run and block 345 detects there are no tasks being processed, the computing system may enter into sleep state in block 335. During sleep state, the host processor is idle and may reduce or disable its power consumption. The free running counter 225 will continue to count during the sleep state. Upon receiving an interrupt, the processor's sleep state is interrupted 365, thus waking from sleep state and increasing its power consumption. The task scheduler 340 schedules any tasks ready for execution, and the task is processed 345.

Figure 4:
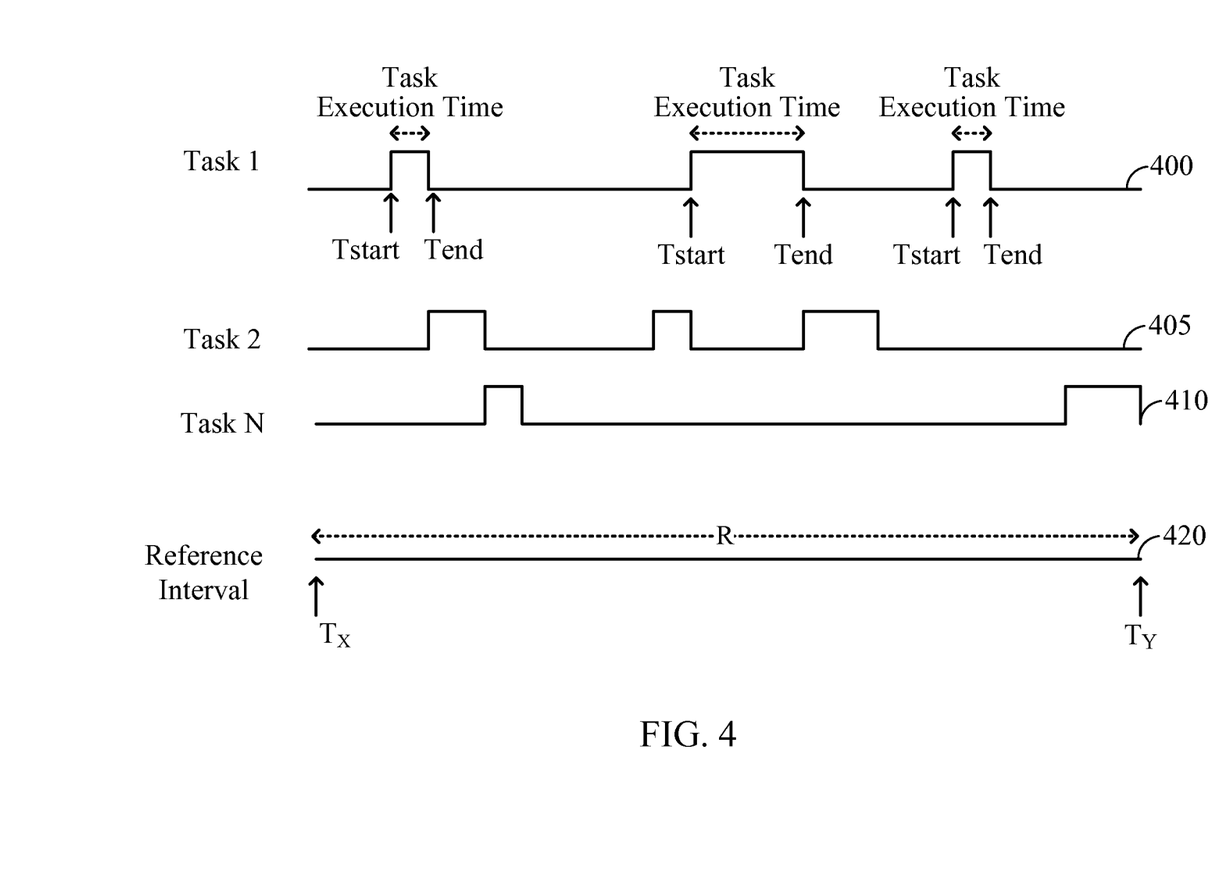
FIG. 4 is a graphical illustration of various timing scenarios that can occur within a real time computing system during processing of application tasks.

FIG. 4, timelines 400, 405, and 410 are an illustration of various timing scenarios that can occur within a real time computing system during processing of application tasks. In these illustrations, time increases from $T_X$ to $T_Y$ in FIG. 4.

The term "reference interval" may be defined as a period of time or described as a corresponding number of cycles, as measured by the free running counter 225. The reference interval may be described by variables X and Y, where X denotes the start point of the reference interval, and Y denotes the end point of the reference interval 420 over a period.

$$\text{Reference interval} = T_Y - T_X \quad \text{(Eq. 1)}$$

FIG. 4, element 400 illustrates an exemplary method of measuring task load running on a computing system. Prior to the execution of a scheduled task, the computing system will read the value from the free running counter 225; the value is defined as $T_{start}$. The scheduled task is then executed until it is halted. The task is halted upon completion of its execution, or upon being preempted by another task. Once the task is halted, the real time computing system will read the value from the free running counter, the value is defined as $T_{end}$. Examples of $T_{start}$ and $T_{end}$ are shown in element 400. The term, "task execution cycles" is defined by taking the difference between $T_{end}$ and $T_{start}$ and is shown in Equation 2. A person of ordinary skill in the art may perform taking such a difference through software or through hardware.

$$\text{Task Execution Cycles} = T_{end} - T_{start} \quad \text{(Eq. 2)}$$

The task execution cycles may be accumulated over a reference interval previously defined over interval X, Y 420, as shown in Equation 3. An exemplary embodiment to accumulate the task execution cycles, is using a hardware or software accumulator element with sufficient bits to avoid overflow during the reference interval. This hardware or software accumulator is herein referred to as "accumulator". As a further exemplary embodiment, the accumulator may be implemented in the computing system or may be an accumulator external to the computing system.

$$\text{Accumulated Task Execution Cycles} = \sum_{n=X}^{Y} (T_{end}^n - T_{start}^n) \quad \text{(Eq. 3)}$$

The load of each task may be determined by dividing the accumulated task execution cycles by the reference interval, as shown in Equation 4. Those of ordinary skill in the art will appreciate that this computation may be applied to any task to compute its load.

$$\text{Task Load} = \frac{\sum_{n=X}^{Y}(T_{end}^n - T_{start}^n)}{T_Y - T_X} \quad \text{(Eq. 4)}$$

Figure 8:
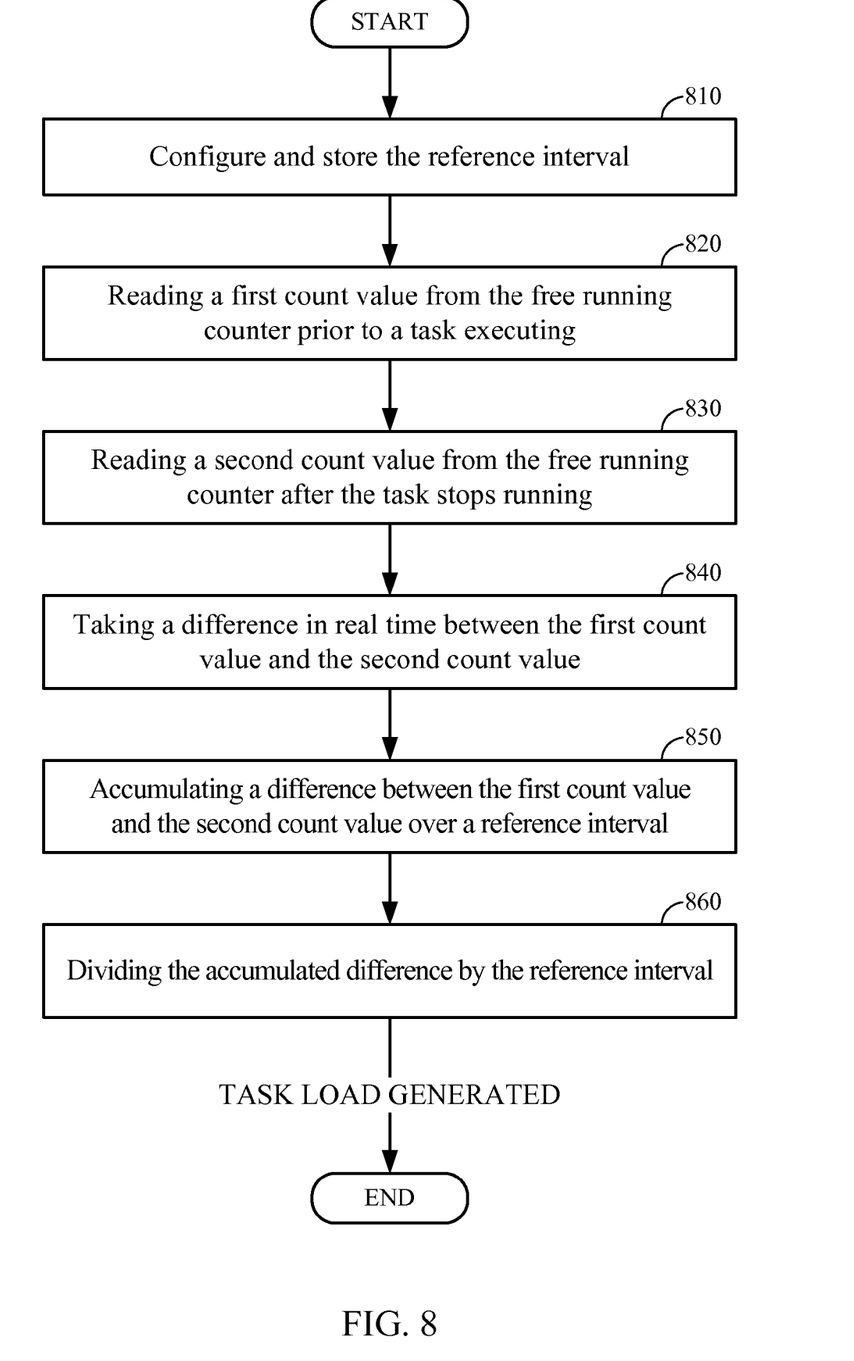
FIG. 8 is a flowchart illustrating a method of determining a task load.

FIG. 8 is a flowchart illustrating a method of determining a task load. The reference interval is configured and stored 810. As discussed previously, exemplary illustrations of configuration are configuring the reference interval via software and storing the value in memory, or via hardware configuration. Prior to a task executing, a first count value is read from the free running counter 820. After the task stops running, a second count value is read from the free running counter 830. A processor may take the difference in real time between the first count value and the second count value 840. An exemplary illustration of taking a difference in real time between the first and second count values is seen in Equation 2, where the difference may be taken via hardware or software methods. An accumulator may accumulate the difference between the first count value and the second count value over the configured reference interval 850. An exemplary illustration of accumulating the difference between count values is seen in Equation 3, where the accumulator may be implemented in hardware or software. The task load may be computed 860 by dividing the accumulated difference by the reference interval. An exemplary illustration of computing the task load is seen in Equation 4, where the computation may occur in hardware or software.

One of ordinary skill in the art will understand the determined task load may be applied in an electronic device, selected from a group consisting of a set top box, music player, video player, entertainment unit, navigation device, communications device, personal digital assistant (PDA), fixed location data unit, and a computer, into which the method of determining the task load is integrated.

One of ordinary skill in the art may use the task load for various purposes such as system design considerations or as an input parameter to other applications that may utilize the task load information. For example, when a high priority task is being executed, another application may use the task load information to limit the computing system's loading. An exemplary embodiment for utilizing the task load will be discussed later in this document.

The reference interval may be configured and stored. The reference interval may be configured such that there is sufficient resolution to accurately accumulate task execution cycles over a reference interval. As an illustration, the reference interval may be configured to a value less than the following: the period of the free running counter multiplied by the maximum count value of the accumulator. The configurable reference interval may be configured via software or hardware. For example, a reference interval may be configured by software and the reference interval stored in memory that is read by a processor. Alternatively, the reference interval may be configured in hardware.

An exemplary illustration of a hardware configuration is setting a latch or flip flop with the value of the reference interval.

Additionally the free running counter as shown at 225 may be set by a person of ordinary skill in the art, to a frequency great enough to capture the task execution cycles accurately.

Figure 5:
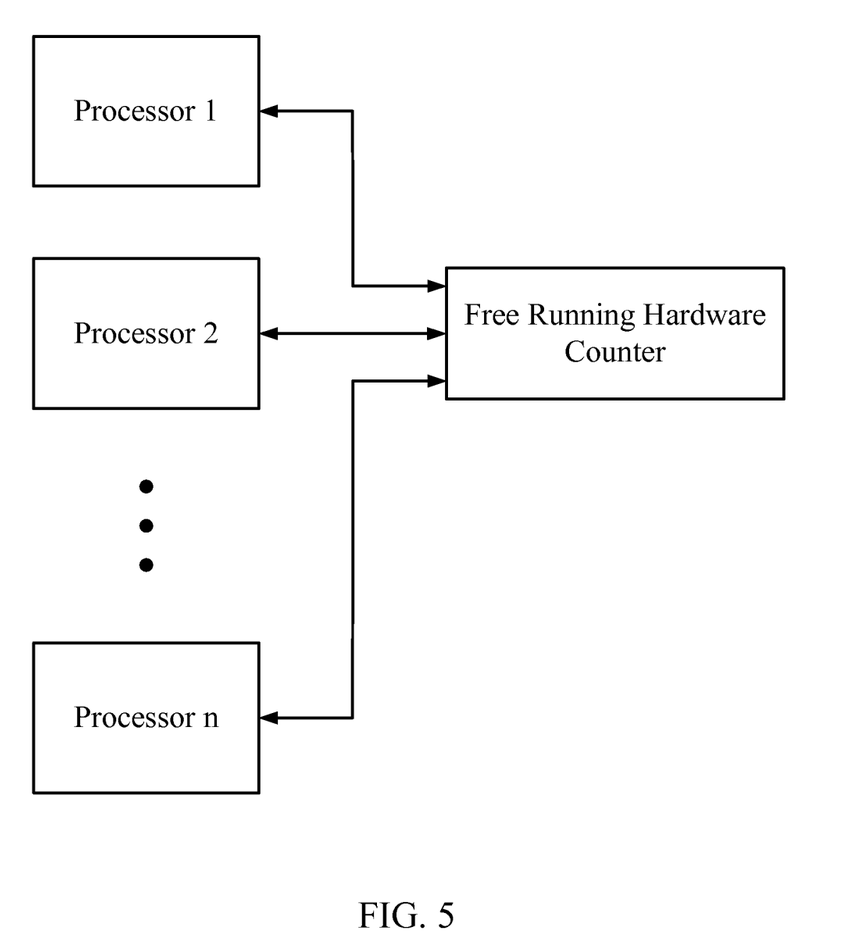
FIG. 5 is a block diagram of an exemplary embodiment of a multi-processor system.

FIG. 5 is an exemplary embodiment of a multi-processor system. The multi-processor system may be connected to an individual or shared free running counter. An individual task load may be calculated as discussed and by utilizing Equations 1-4. As an example, any task running on any of the processors in FIG. 5, may compute a task load.

Figure 6:
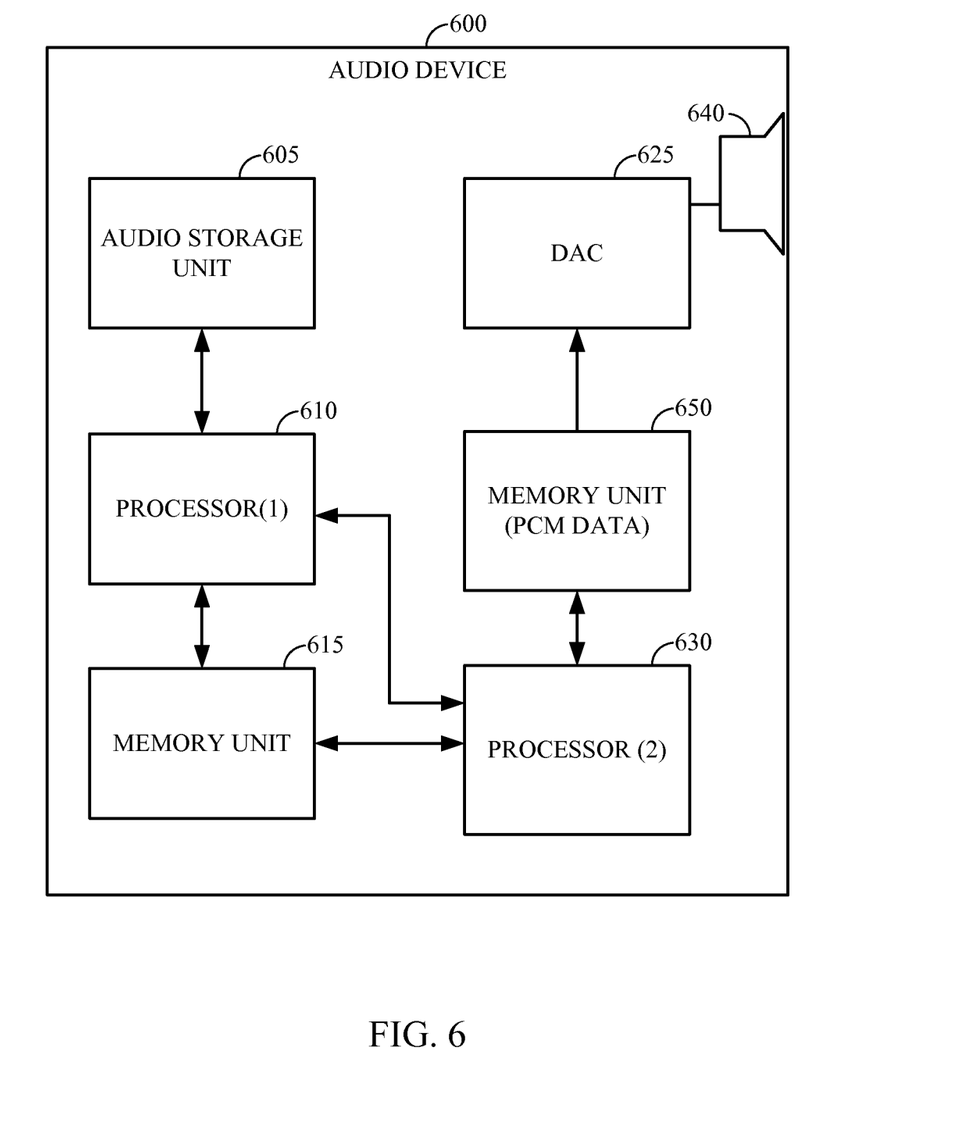
FIG. 6 is a block diagram of an exemplary illustration of an audio device.

FIG. 6 is an exemplary illustration of an audio device 600. An audio device may be a device capable of processing any type of audio or video files, for example voice, or Musical Instrument Digital Interface (MIDI) files. An audio device 600 may include an audio storage unit 605 that stores MIDI files and other types of data. The audio storage unit 605 may comprise any type of volatile or non-volatile memory or storage coupled to processor 610.

Audio device 600 also includes a first processor 610 and a second processor 630 operating together to process audio files to generate audio information for an end user. FIG. 6 illustrates an architecture that separates the audio tasks between the first processor 610, and second processor 630. One of ordinary skill in the art may appreciate other alternative implementations such as combining elements 610 and 630 into a single unit such that one processor performs the functionality of elements 610 and 630. As an example, first processor 610 may be an ARM processor and second processor 630 may be a digital signaling processor (DSP). As another example, where a single processor performs the combined functionality of 610 and 630, the single processor may perform both processing and digital signal processing.

In an exemplary embodiment, the first processor 610 and second processor 630 process audio tasks over a reference interval. As used herein, the phrase "audio frame" refers to a block of time or a corresponding number of clock or counter cycles. An audio frame may be the reference interval over which an audio task is processed.

The reference interval may be selected to be equal to a 10 millisecond (ms) interval. The reference interval may have 480 samples for a device operating at a sampling rate of 48 KHz. A person of ordinary skill in the art will recognize that an audio wave form can be sampled at different rates, one such sampling rate may be 48 Khz. The desired maximum number of cycles for a processor to process one audio task will herein be referred to as MaxCycles. MaxCycles is essentially the reference interval time, converted into cycles. This value is computed in Equation 5 below.

MaxCycles=(Clock Frequency)×(Reference Interval)   (Eq. 5)

A sample calculation where the clock frequency=19.2 MHz gives:

MaxCycles=(19.2 MHz)×(10 millisecond)=192,000 cycles

Processor 610 may read from and write data to audio storage 605. Additionally, processor 610 may read data from and write data to a memory unit 615. As an example, processor 610 may read MIDI files from audio storage 605 and write MIDI files to memory unit 615. For each audio frame, processor 610 may retrieve one or more of the MIDI files and parse the MIDI files to extract one or more MIDI instructions. The MIDI instructions comprise various parameters including MIDI voices that require processing. The MIDI instruction parameters may instruct a particular MIDI voice to start or stop, relate to aftertouch effects, breath control effects, program changes, pitch bend effects, control messages such as pan left or right, sustain pedal effects, main volume control, system messages such as timing parameters, lighting effect cues, and or other sound affects. A "voice" or a "MIDI voice" can be any particular sound.

Based on the timing of the MIDI instructions, first processor 610 schedules MIDI instructions for processing by the second processor 630. The first processor 610 may provide the scheduling of MIDI instructions to memory unit 615 for access by second processor 630 so that second processor 630 can process the MIDI instructions. Alternatively, first processor 610 may execute the scheduling by dispatching the MIDI instructions directly to second processor 630 in a time synchronized manner. In an exemplary model, the first processor 610 processes and stores the synthesized Pulse Code Modulated (PCM) audio samples in Memory Unit 650. The Digital-to-Analog Converter (DAC) 625 takes the PCM samples from 650 and plays the samples out to speaker 640.

Second processor 630 processes the MIDI instructions according to the scheduling created by first processor 610. However, second processor 630 may also have other higher priority tasks that may require processing prior to executing the MIDI instructions and therefore the processing of an audio task may take longer than the MaxCycles or reference interval. These types of interruptions may cause a future audio task to also exceed the MaxCycles or reference interval. First processor 610 may utilize a method of scheduling the next or future audio task such that the processing of a future audio task does not take longer than the MaxCycles or reference interval. As an illustration, this may be accomplished by reducing the number of voices processed. The number of voices that are reduced is proportional to the number of cycles exceeded when processing the prior audio task. This is discussed further in the context of Equation 12.

Figure 7:
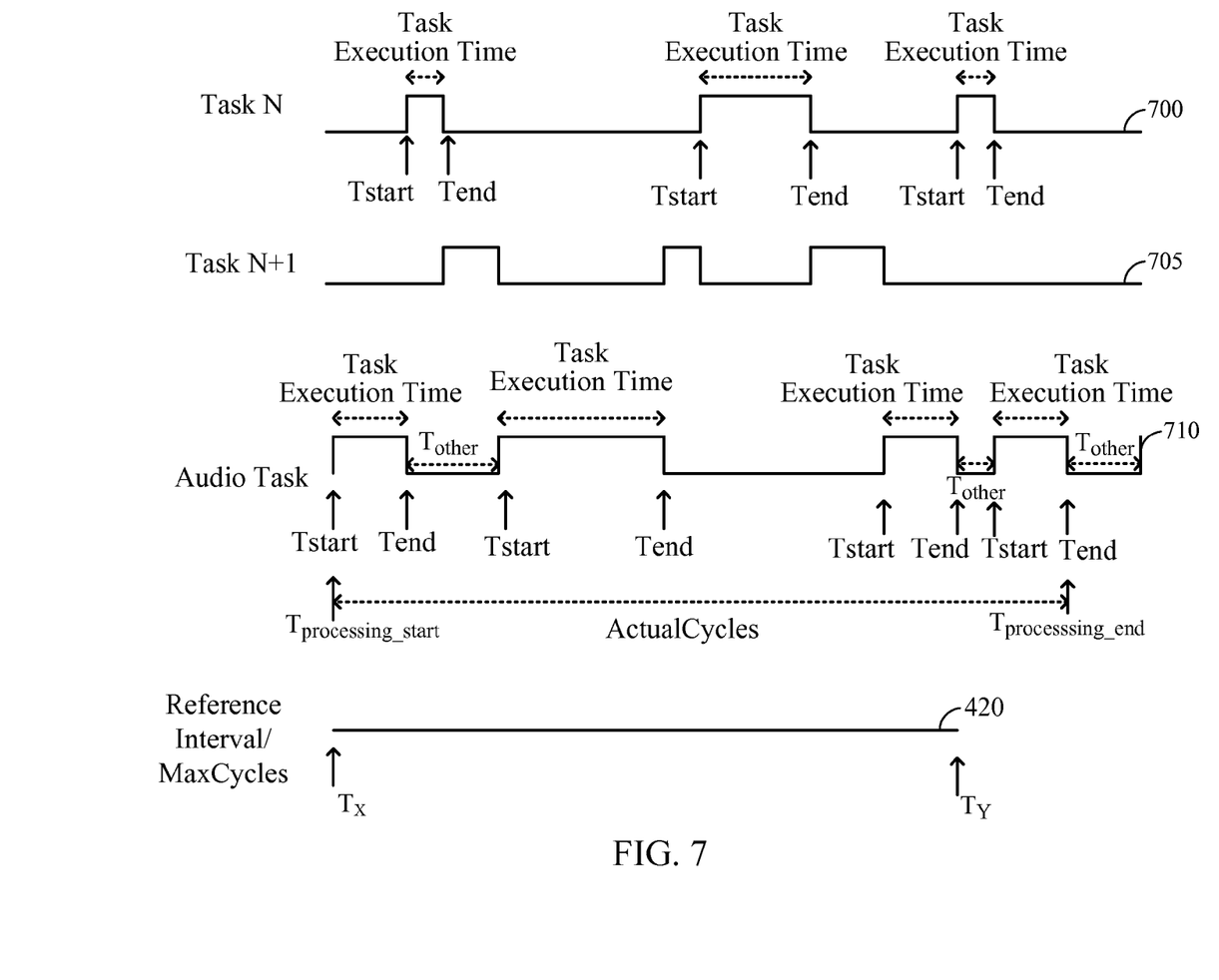
FIG. 7 is a graphical illustration of the timing in an exemplary embodiment of an audio task that utilizes the task load in calculations to estimate the time or cycles available for processing of audio tasks in the next frame.

FIG. 7 illustrates an exemplary processing of audio task 710, and the interruption of the audio processing when higher priority tasks such as Task N 700, or Task N+1 705 interrupt the currently executing audio task. The audio task 710 may utilize the task load (Eq. 4) in calculations discussed below, to aid in the scheduling of the processing of audio tasks in the next frame.

To synthesize a higher number of MIDI voices for rich sound quality it is desirable for the processing of a single audio task to complete within one reference interval 420. During periods where the audio processing is interrupted for processing of other higher priority tasks, the processing of the audio task may not be completed within the MaxCycles or reference interval, but may continue being processed into the subsequent reference interval. To offset this additional time, a number of voices may be reduced from the next audio task to be processed so that the next audio task is more likely to complete processing within the reference interval. A person of ordinary skill in the art, will recognize this embodiment may be used to reduce a number of voices from any future audio task without departing from the spirit and scope of this exemplary embodiment.

Scheduling parameters for a future audio task may be established. That is, the number of voices processed in the next audio task or a future audio task may be reduced, if processing of the current audio task exceeded the reference interval or MaxCycles, that is, if there was processing "carry-over" into the next reference interval. Herein, the term "carry-over" is used to indicate the number of cycles an audio task has exceeded the MaxCycles. However, herein, "carry-over" may also indicate the number of cycles available when an audio task completes processing before reaching the MaxCycles. At other times, the "carry-over" value may be zero such as upon power-on of the device employing this method. Power-on typically means it may take some time for the audio application to reach a steady state. The "carry-over" value may also be zero when the audio task was processed within the same number of cycles as the MaxCycles period.

To determine the carry-over cycles, MaxCycles may be subtracted from the actual number of cycles the audio task took to process as shown in Equation 6, where the MaxCycles value may be computed using Equation 5. ActualCycles is the total number of cycles it takes to complete processing the audio task including interrupt time. A person of ordinary skill in the art will recognize that units of time may be converted to cycles by multiplying the unit of time times the counter or clock frequency, and units of cycles may be converted to units of time by multiplying the number of cycles times the inverse of the counter or clock frequency. Therefore, the interrupt time is the time the processing of the audio task was interrupted while the processor processed other tasks or the number of equivalent cycles. A person of ordinary skill in the art will also recognize that CarryOverCycles may be determined by other methods without departing from the spirit of this exemplary embodiment. For example, CarryOverCycles may also be calculated by a modification of Equation 6, that is by subtracting ActualCycles from MaxCycles. For the purposes of clarity, Equation 6 will be used in this document.

$$\text{CarryOverCycles} = \text{ActualCycles} - \text{MaxCycles} \quad \text{(Eq. 6)}$$

As an example, ActualCycles may be determined by utilizing the free running counter 225 to measure the processing start and end points for a given audio task and by taking the difference between them. This concept is illustrated in Equation 7. A person of ordinary skill in the art will appreciate other methods to measure ActualCycles without departing from the spirit of this exemplary embodiment.

$$\text{ActualCycles} = T_{processing\_end} - T_{processing\_start} \quad \text{(Eq. 7)}$$

A sample calculation where the MaxCycles=192,000 cycles and ActualCycles for the audio task is 249,600 cycles or 13 milliseconds, gives:

CarryOverCycles=249,600 cycles−192,000 cycles=57,600 cycles

In the context of Equation 6, when the CarryOverCycles value is zero or less than zero, processing of the audio task has not exceeded MaxCycles, and therefore the next audio task or future audio task may be processed without reducing voices for processing or may reduce the voices for processing. When the CarryOverCycles value is greater than zero, the number of cycles used to process the audio task has exceeded reference interval 420 or the corresponding MaxCycles, and voices may be reduced from the next or future audio processing so that the processing of said audio task is more likely to complete within its reference interval or MaxCycles.

If the carry-over is greater than zero, that is, if the current task took longer to execute than the period defined by the reference interval 420 or MaxCycles, then the number of voices to be reduced when processing the next or future audio task may be calculated or scheduled using parameters from the current task. To determine the number of cycles available for processing of the next or future audio task, certain parameters from the current audio task may be subtracted or added to the value of MaxCycles for the next or future audio task. These parameters include the time or number of cycles the processor spends processing higher priority tasks other than the audio task and the CarryOverCycles. Herein, the number of cycles the processor spends processing tasks other than the audio task will be called "OtherTasks". Equation 8 illustrates the number of cycles available for processing of the next audio task or future audio task.

$$\text{NumCyclesAvailable} = \text{MaxCycles} - \text{OtherTasks} - \text{CarryOverCycles} \quad \text{(Eq. 8)}$$

An exemplary illustration to calculate OtherTasks is to subtract from ActualCycles, the CarryOverCycles as given in Equation 7, and the accumulated task execution cycles as given in Equation 3. A person of ordinary skill in the art will recognize other methods to determine OtherTasks without departing from the spirit of this exemplary embodiment.

$$\text{OtherTasks} = \text{ActualCycles} - \text{CarryOverCycles} - \text{Accumulated Task Execution Cycles} \quad \text{(Eq. 9)}$$

A person of ordinary skill in the art will understand that Equations 8 and 9 may be simplified into Equation 10.

$$\text{NumCyclesAvailable} = \text{MaxCycles} - \text{ActualCycles} + \text{Accumulated Task Execution Cycles} \quad \text{(Eq. 10)}$$

The number of voices that may be supported for the next or future audio task, herein referred to as "MaxVoiceCount" is equal to the number of cycles available for the next or future audio task multiplied by the voice count divided by the number of cycles the processor spends synthesizing or decoding the previous audio task. This concept is illustrated in Equation 11. The parameter "voice count" may be contained in the audio task. The parameter "$t_{synth}$", may be measured by any counter from the time the voice synthesis begins, to the time the voice synthesis is completed for a given audio task.

$$\text{MaxVoiceCount} = \text{NumCyclesAvailable} \times (\text{voice count} / t_{synth}) \quad \text{Eq. 11}$$

As discussed previously, the number of voices that are reduced from the processing load may be computed. The number of voices that are reduced is proportional to the number of cycles exceeded when processing the prior audio task. For example, to calculate the number of voices that are reduced, the CarryOverCycles is multiplied by the voice count divided by tsynth. One of ordinary skill will recognize that the result of the aforementioned calculation may be rounded up so that a whole number of voices is reduced.

$$\text{NumVoicesReduced} = \text{CarryOverCycles} \times (\text{voice count} / t_{synth}) \quad \text{Eq. 12}$$

Figure 9:
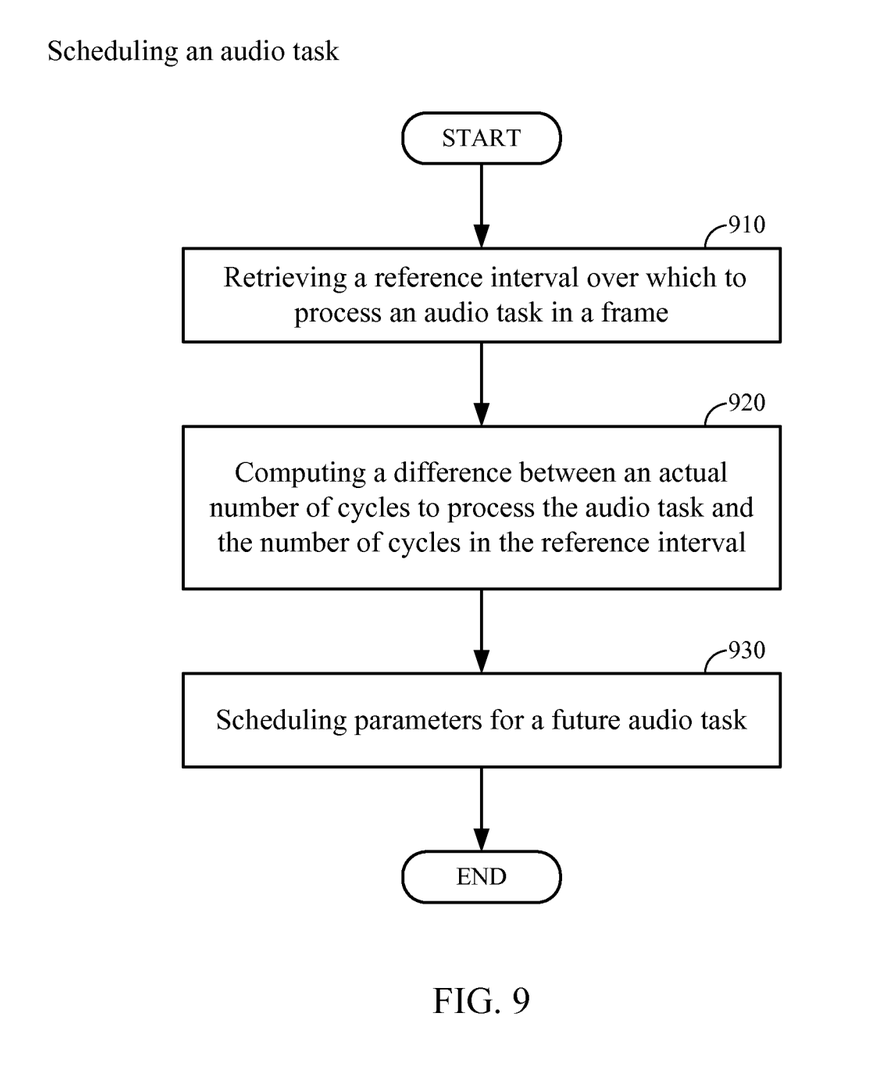
FIG. 9 is a flowchart illustrating a method of scheduling an audio task.

FIG. 9 is a flowchart illustrating a method of scheduling an audio task. The reference interval is retrieved 910. As previously discussed, the reference interval may be stored and configured via software or hardware. Also the reference interval may be configured to a value that provides resolution to accurately accumulate task execution cycles. The difference between an actual number of cycles to process the audio task and the number of cycles in the reference interval is computed 920. An exemplary illustration of computing the difference between an actual number of cycles to process the audio task and the number of cycles in the reference interval is seen in Equation 6 where CarryOverCycles is computed. The computed difference (e.g. CarryOverCycles) may be used to determine scheduling parameters for a future audio task 930. For example, a number of voices to be processed in a future audio task may be reduced if the number of actual cycles to process the audio task in the current frame is greater than the number of cycles in the reference interval.

One of ordinary skill in the art will understand the method for scheduling an audio task may be applied in an electronic device, selected from a group consisting of a set top box, music player, video player, entertainment unit, navigation device, communications device, personal digital assistant (PDA), fixed location data unit, and a computer, into which the method of scheduling an audio task is integrated.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

What is claimed is:

1. A method for scheduling on a processor an audio task for a voice, the method comprising:
   retrieving a reference interval over which to process the audio task on the processor;
   computing by the processor a difference between an actual number of cycles to process on the processor the audio task and the number of cycles in the reference interval; and
   scheduling parameters for a future audio task for processing on the processor.

2. The method of claim 1, further comprising:
   computing by the processor a number of cycles available for processing on the processor the future audio task based on a task load of the audio task and based on the actual number of cycles to process the audio task.

3. The method of claim 1, further comprising computing by the processor a number of cycles available for processing on the processor the future audio task by NumCyclesAvailable.

4. The method of claim 1, wherein the scheduling parameters are synthesis voice parameters in an audio frame.

5. The method of claim 1, wherein the reference interval is configurable via hardware or software.

6. The method of claim 1, wherein the scheduling comprises processing on the processor less audio task cycles for the future audio task than processed by the processor in the current audio task.

7. The method of claim 1, wherein the scheduling comprises processing on the processor an equal or greater number of audio task cycles for the future audio task relative to the current audio task.

8. The method of claim 1 wherein the method for scheduling an audio task is applied in an electronic device, selected from a group consisting of a set top box, music player, video player, entertainment unit, navigation device, communications device, personal digital assistant (PDA), fixed location data unit, and a computer, into which the method of scheduling an audio task is integrated.

9. An apparatus comprising:
a processor for computing a difference between an actual time to process an audio task and a the number of cycles in a reference interval, and scheduling a future audio task based on the computed difference;
a memory for storing the scheduling parameters; and
a free running counter to provide at least two count values to the processor to compute the actual time of the audio task.

10. The apparatus of claim 9, wherein the processor is configured to run a real time computing system.

11. The apparatus of claim 9, wherein the actual time to process the audio task is based on one or more task execution times and time spent processing one or more other tasks.

12. The apparatus of claim 9, wherein the scheduled audio task cycles are less for a future audio task relative to a current audio task.

13. The apparatus of claim 9, wherein the scheduled audio task cycles are an equal or greater number of cycles for the future audio task relative to the current audio task.

14. The apparatus of claim 9 incorporated into a device selected from a group consisting of a music player, a video player, an entertainment unit, a navigation device, a communications device, a personal digital assistant (PDA), a fixed location data unit, and a computer.

15. A computer-readable storage medium embodying a set of instructions executable by one or more processors, comprising:
code for retrieving a reference interval over which to process an audio task;
code for computing a difference between an actual number of cycles to process the audio task and the number of cycles in the reference interval; and
code for scheduling parameters for a future audio task.

16. The computer-readable storage medium of claim 15, further comprising:
code for computing a number of cycles available for processing the future audio task, based on a task load of the audio task and based on the actual number of cycles to process the audio task.

17. The computer-readable storage medium of claim 15, further comprising computing a number of cycles available for processing the future audio task by NumCyclesAvailable.

18. The computer-readable storage medium of claim 15, wherein the scheduling parameters are synthesis voice parameters in an audio frame.

19. The computer-readable storage medium of claim 15, further comprising:
code for configuring the reference interval to a value equal to or less than a period of a free running counter multiplied by a maximum count value of the accumulator.

20. The computer-readable storage medium of claim 15, wherein the scheduling comprises processing less audio task cycles for the future audio task than processed in the current audio task.

21. The computer-readable storage medium of claim 15, wherein the scheduling comprises processing an equal or greater number of audio task cycles for the future audio task relative to the current audio task.

* * * * *